Feb. 23, 1965
W. H. HUEBL ETAL
3,170,765
SUSPENDED WATER DETERMINATION
Filed May 28, 1963
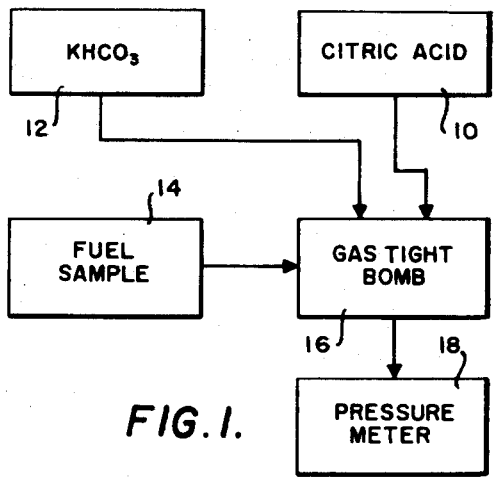
FIG. 1.
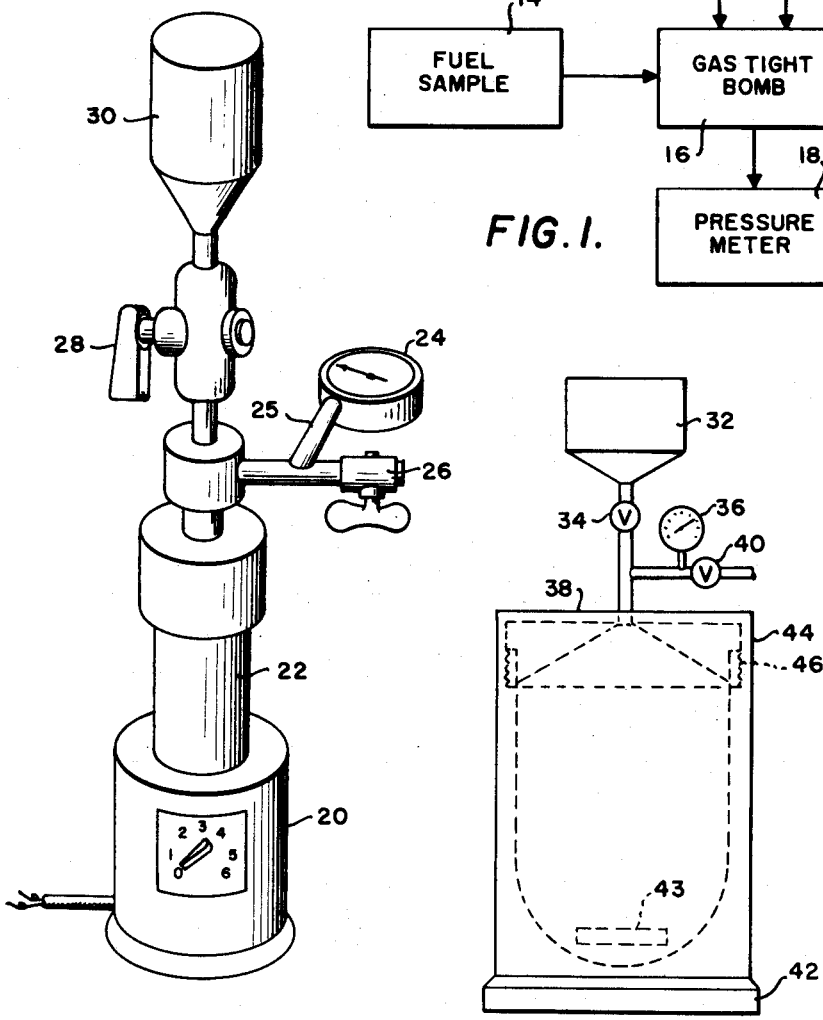
FIG. 2.
FIG. 3.
INVENTORS
WILLIAM H. HUEBL
PAUL SCHATZBERG
BY NATHAN GLASSMAN
ATTYS.

United States Patent Office 3,170,765
Patented Feb. 23, 1965

3,170,765
SUSPENDED WATER DETERMINATION
William H. Huebl, Paul Schatzberg, and Nathan Glassman, Annapolis, Md., assignors to the United States of America as represented by the Secretary of the Navy
Filed May 28, 1963, Ser. No. 284,298
7 Claims. (Cl. 23—230)
(Granted under Title 35, U.S. Code (1952), sec. 266)

The invention described herein may be manufactured and used by or for the Government of the United States of America for governmental purposes without the payment of any royalties thereon or therefor.

This invention relates to a method and apparatus for testing the purity of organic liquids and more particularly relates to a method and apparatus for measuring the amount of suspended water in an organic liquid.

It is frequently desirable to determine the amount of contaminants such as dispersed or suspended water in an organic liquid. In aircraft, for example, dispersed water in the fuel will freeze at high altitudes due to the cold. The ice crystals so formed may block filters and close tolerance machinery and thus reduce the efficiency of the motor or cause failure altogether. Further, the presence of dispersed water in hydraulic fluids will cause corrosion and emulsions which interfere with the proper function of the hydraulic system.

The detection of free or dispersed water in the fuel by the use of water soluble dyes or by lowering the temperature of sample of the fuel and measuring the ice formation is slow and inaccurate. These methods are not selective to suspended water. Accordingly, it is an object of this invention to provide an improved method for measuring the amount of suspended water in an organic liquid.

It is a further object of this invention to provide a safe and fast method of determining the amount of suspended water in an organic liquid.

It is a still further object of this invention to provide simple and inexpensive apparatus for determining the amount of suspended water in an organic liquid.

It is a still further object of this invention to provide a method and apparatus for determining the amount of suspended water in an organic liquid through the evolution of non-flammable, non-toxic gases at low pressures.

Other objects and many of the attendant advantages of this invention will be readily appreciated as the same becomes better understood by reference to the following detailed description when considered in connection with the accompanying drawings wherein:

FIG. 1 is a flow diagram illustrating the method of an embodiment of the invention;

FIG. 2 is a perspective view of an embodiment of the invention; and

FIG. 3 is a flow diagram of apparatus which are an embodiment of this invention.

Referring now in particular to FIG. 1 a flow diagram is shown which is illustrative of the method of this invention. As shown in this figure the blocks 10, 12, and 14 containing designations of possible materials used in practicing this invention. The blocks are connected to the block 16 representing a gas tight bomb or container in which the ingredients are mixed and to the block 18 representing a meter for measuring the gas pressure in the container indicated by the block 16. A mixture of finely powdered potassium bicarbonate and citric acid is added to the gas tight bomb. A fuel sample as indicated by block 14 is added to the gas tight bomb indicated by the block 16. A pressure meter indicated by the block 18 is attached to the bomb. The bomb is sealed and the gas evolved by the combination of suspended water in the fuel sample indicated by block 14 with potassium bicarbonate indicated by block 12 and citric acid indicated by block 10 creates a pressure which is proportional to the initial amount of suspended water. This pressure is indicated by the pressure meter 18.

A perspective view of the apparatus which is suitable for carrying out the above method is shown in FIG. 2. The stator of a magnetic stirrer 20 is placed underneath a reservoir within a gas bomb 22. The rotor of the magnetic stirrer is inside the gas bomb 22 and moves in response to a magnetic field set up by the stator 20 so as to mix the contents of the gas bomb 22. A pressure meter 24 is connected so as to be in communication with the inside of the gas bomb 22 through the joint 25. A venting valve 26 is placed beyond the joint 25 to allow air to escape, permitting entrance of the liquid and to release the gas from the bomb 22 after the test. A second valve 28 is mounted above the gas bomb 22 and connects a liquid reservoir 30 to the gas bomb. A water-soluble powder which may be potassium bicarbonate and citric acid is placed within the open bomb 22 with the magnetic rotor and then the cap 25 is screwed on firmly. When the valves 28 and 26 are opened the test sample of an organic liquid from the reservoir 30 will flow by gravity into the gas bomb 22. The valves are then closed and the magnetic stirrer 20 is turned on. The water-soluble compound will dissolve in the suspended water and release carbon dioxide. This will cause pressure to mount inside the gas bomb 22. The pressure meter 24 will indicate this pressure and so give an indication of the amount of suspended water in the sample organic liquid within the gas bomb 22.

A flow diagram of the apparatus of FIG. 2 is shown in FIG. 3 as having a fuel reservoir 32, a liquid valve in communication with the fuel reservoir 32, a pressure meter 36 on the opposite side of the valve 34 from the fuel reservoir 32, a gas bomb 38 in communication with both pressure meter 36 and the valve 34 and a venting valve 40 in communication with the gas bomb 38. A magnetic stirrer 42 is shown beneath the gas bomb 38. The rotor 43 of the magnetic stirrer 42 is inside the gas bomb 38. The gas bomb is sealed by the air tight cap 44 and the gasket 46.

The powder is placed within the open bomb 38 with the magnetic rotor 43. The screw cap 44 is closed pressure tight and the valve 34 is closed. A sample of an organic liquid which is to be tested for suspended water is poured into the reservoir 32. Valve 40 is opened and then valve 34 is opened so that the organic liquid will flow into the bomb 38 and mix with the powder. When the liquid appears at the exit of the valve 40, the valve 34 is closed and then valve 40 is closed. It should be noted that for maximum sensitivity of this apparatus there should be no air (void) space in the bomb at the beginning of the test and as little as practicable air (void) space in the line to the pressure gage. This was accomplished in the bomb by having the liquid fill the bomb and the line right up to the pressure gage 36.

The magnetic stirrer 42 is turned on so that the magnetic rotor 43 which is inside of the gas bomb 38 will rotate so as to mix the effervescent powder thoroughly with the organic liquid which is being tested. An amount of carbon dioxide will be released which is proportional to the suspended water in the organic liquid. This gas will create the pressure inside of the gas bomb 38 which will be indicated by the pressure meter 36. This pressure reading is indicative of the initial amount of suspended water in the organic liquid.

The equipment is assembled as described above to make measurements on the sample of organic liquids. The equipment must be dry and appear clean to a visual inspection. Samples of the liquid to be tested are taken in a clean polyethylene bottle. The bottles are filled to the top and capped immediately. The test should be run on these samples within an hour and before samples have been exposed to any changes in temperature greater than 5° F.

Many water-soluble compounds may be used to perform this test method. However, potassium bicarbonate or sodium bicarbonate combined with citric acid produce suitable results. The gas evolved is carbon dixoide which is non-flammable non-toxic. The reaction is quick and simple and the materials are inexpensive.

*Example I*

Five grams of powdered potassium bicarbonate and five grams of powdered citric acid are poured into the opened gas bomb. The powders should pass through a 250 micron screen. The cap 44 is screwed down tightly and valve 40 is opened. With valve 34 closed a 200 ml. (milliliter) fuel sample of Navy Grade JP–5 jet fuel is poured into the reservoir 32. The valve 34 is then opened to admit the fuel into the bomb 38. When fuel appears at the exit of valve 40, valve 34 is closed and then valve 40 is closed.

The magnetic stirrer 42 is turned on and after one-half minute is turned off. If the temperature is within 5 degrees of 55 degrees Fahrenheit, the pressure on the meter 36 is read three minutes after the magnetic stirrer is turned on. When the amount of suspended water by analysis inside the jet fuel is between 0–10 p.p.m. (parts per million) the pressure meter 36 reads between 0 and 15 mm. Hg (millimeters of mercury) at the end of the three minutes; when the suspended water by analysis is between 10–50 p.p.m. the pressure meter 36 reads between 15–30 mm. Hg and when the suspended water by analysis is greater than 50 p.p.m. the pressure meter 36 reads between 30–60 mm. Hg. On completion of the test, valve 34 is opened and the cap 44 is unscrewed. The bomb and cap assemblies are emptied, cleaned and dried.

*Example II*

Five grams of powdered sodium bicarbonate and five grams of powdered citric acid are poured into the opened gas bomb. The powders should pass through a 250 micron screen. The cap 44 is screwed down tightly and valve 40 is opened. With valve 34 closed a 200 ml. (milliliter) fuel sample of Navy Grade JP–5 jet fuel is poured into the reservoir 32. The valve 34 is then opened to admit the fuel into the bomb 38. When the fuel appears at the exit of valve 40, valve 34 is closed then valve 40 is closed.

The magnetic stirrer 42 is turned on and after one-half minute is turned off. If the temperature is within 5 degrees of 75 degrees Fahrenheit the pressure on the meter 36 is read 2 minutes after the magnetic stirrer is turned on. The meter will read 0–15 mm. Hg of pressure for 0–10 p.p.m. suspended water as determined by the analysis; the pressure meter 36 will read 15–30 mm. Hg for 10–50 p.p.m. of suspended water by analysis; the pressure meter 36 will read 30–60 mm. Hg for greater than 50 p.p.m. of suspended water as determined by analysis.

The ionic equation of the reaction and the above two examples can be written as:

$$H_3O^+ + HCO_3^- \rightarrow 2H_2O + CO_2$$

where $H_3O^+$ is the hydronium ion consisting of the proton from the ionized citric acid and suspeneded water in the fuel. While water is produced by the reaction it is the suspended water initially present in the fuel which determines the rate of the reaction, since the reactants are present in considerable excess. This rate is demonstrated by the pressure of the evolved gas. The reaction rate of course, varies with the particle-size distribution of water droplets, the particle-size distribution of the dry chemicals, the solubility and rate of solution of the carbon dioxide in jet fuel, the rate and length of stirring the fuel, the temperature, and the initial suspended water concentration.

By strict adherence to the procedure as stated, only the suspended water concentration has a significant effect on the reaction rate as manifested by the pressure reading.

For convenience the powdered chemicals used in making this test can be packaged using a transparent four-mil polyethylene sheet. The two chemicals may be kept in the same package separated from each other by a sheet of polyethylene so as to prevent reaction in the package due to residual moisture. Packaged in this way the chemicals will have a long shelf life.

The method and apparatus of this invention provides a simple inexpensive test for the amount of suspended water in fuel. The test is fast and safe since only carbon dioxide is evolved. The equipment and the necessary chemicals do not take much shelf space and may be carried on board ship if necessary.

Obviously many modifications and variations of the present invention are possible in the light of the above teachings. It is therefore to be understood that within the scope of the appended claims the invention may be practiced otherwise than as specifically described.

What is claimed is:

1. The method of determining the presence of suspended water in an organic liquid comprising the steps of:
   bringing said liquid into intimate contact with a mixture of water soluble powders which are substantially inert with respect to said organic liquid and react together when in solution to release a gas;
   measuring the pressure of the gas at a predetermined time after the reaction is started to thereby determine the presence of suspended water.

2. The method of claim 1 in which the powders in the mixture are potassium bicarbonate and citric acid.

3. The method of claim 1 including the step of stirring the liquid to bring the liquid into intimate contact with said powders.

4. The method of claim 1 in which the temperature of the reaction is held within a predetermined range of temperatures.

5. The method of determining the presence of suspended water in a substantially water insoluble liquid comprising:
   introducing a first and second water soluble material into a container, said materials being of a type which are inert in respect to said liquid and which react together in the presence of water to produce a gas, the rate of production of gas being proportional to the amount of suspended water present;
   introducing a sample of the liquid sufficient to substantially fill the container;
   hermetically sealing the container;
   measuring the pressure generated during a predetermined time interval whereby the amount of suspended water may be determined.

6. The method of claim 5 in which the first and second water soluble materials are sodium bicarbonate and citric acid respectively.

7. The method of claim 5 in which the first and second water soluble materials are potassium bicarbonate and citric acid respectively.

References Cited by the Examiner

UNITED STATES PATENTS

| | | | |
|---|---|---|---|
| 2,866,690 | 12/58 | Coyne | 23—253 |
| 2,974,018 | 3/61 | McNeilly | 23—253 |
| 3,118,735 | 1/64 | Favre et al. | 23—230 |

MORRIS O. WOLK, *Primary Examiner.*

JAMES H. TAYMAN, Jr., *Examiner.*